US009397518B1

(12) United States Patent
Theobald

(10) Patent No.: US 9,397,518 B1
(45) Date of Patent: Jul. 19, 2016

(54) WIRELESSLY TRANSFERRING ENERGY TO A MOBILE DEVICE

(71) Applicant: Daniel Theobald, Sommerville, MA (US)

(72) Inventor: Daniel Theobald, Sommerville, MA (US)

(*) Notice: Subject to any disclaimer, the term of this patent is extended or adjusted under 35 U.S.C. 154(b) by 433 days.

(21) Appl. No.: 13/773,689

(22) Filed: Feb. 22, 2013

(51) Int. Cl.
*H02J 7/00* (2006.01)
*B60L 11/18* (2006.01)
*H02J 7/02* (2016.01)
*G05D 1/02* (2006.01)
*H01F 38/14* (2006.01)

(52) U.S. Cl.
CPC .............. *H02J 7/025* (2013.01); *G05D 1/0217* (2013.01); *H01F 38/14* (2013.01); *B60L 11/182* (2013.01); *B60L 11/1809* (2013.01); *Y10S 901/01* (2013.01)

(58) Field of Classification Search
CPC ............................ B60L 11/1809; B60L 11/182
USPC ......................................... 320/104, 107–108
See application file for complete search history.

(56) References Cited

U.S. PATENT DOCUMENTS

| | | | | |
|---|---|---|---|---|
| 3,425,197 A * | 2/1969 | Kita | ................................ | 56/10.2 F |
| 3,550,714 A * | 12/1970 | Bellinger | ...................... | 180/168 |
| 3,570,227 A * | 3/1971 | Bellinger | ...................... | 56/10.2 A |
| 4,613,803 A * | 9/1986 | Hasegawa et al. | .............. | 701/23 |
| 5,220,263 A * | 6/1993 | Onishi | ............. | G05B 19/41895 |
| | | | | 180/168 |
| 5,646,494 A * | 7/1997 | Han | ..................... | A47L 11/4011 |
| | | | | 318/587 |
| 5,959,423 A * | 9/1999 | Nakanishi | ............. | A47L 11/305 |
| | | | | 15/319 |
| 6,412,604 B1 * | 7/2002 | Schuster | ........................ | 187/290 |
| 7,636,621 B2 * | 12/2009 | Lee | ....................... | G05D 1/0225 |
| | | | | 318/568.12 |
| 7,668,631 B2 * | 2/2010 | Bernini | .......................... | 701/23 |
| 7,953,526 B2 * | 5/2011 | Durkos et al. | .................. | 701/25 |
| 8,027,750 B2 * | 9/2011 | Orita | ...................... | B25J 19/005 |
| | | | | 320/107 |
| 8,115,448 B2 * | 2/2012 | John | ..................... | A61N 1/3785 |
| | | | | 320/108 |
| 8,229,611 B2 * | 7/2012 | Yamada | ............................ | 701/22 |
| 8,290,700 B2 * | 10/2012 | Yamada et al. | ................. | 701/410 |
| 8,618,766 B2 * | 12/2013 | Anderson et al. | .............. | 320/101 |
| 8,689,249 B2 * | 4/2014 | Pino et al. | ......................... | 725/12 |
| 8,736,228 B1 * | 5/2014 | Freed et al. | ..................... | 320/115 |
| 8,755,961 B2 * | 6/2014 | Yamada et al. | .................. | 701/22 |
| 8,767,071 B1 * | 7/2014 | Marshall | ......................... | 348/144 |
| 8,963,488 B2 * | 2/2015 | Campanella et al. | .......... | 320/108 |
| 8,970,070 B2 * | 3/2015 | Sada | ........................ | H02J 5/005 |
| | | | | 307/104 |
| 8,970,167 B2 * | 3/2015 | Krestel | ........................... | 320/108 |
| 9,008,884 B2 * | 4/2015 | Toebes | ................. | B65G 1/0492 |
| | | | | 701/23 |
| 2002/0023802 A1 * | 2/2002 | Ayano | ...................... | B66C 1/461 |
| | | | | 187/290 |
| 2003/0200025 A1 * | 10/2003 | Ross | ............................. | 701/200 |
| 2004/0093116 A1 * | 5/2004 | Mountz | ........................ | 700/216 |
| 2004/0142733 A1 * | 7/2004 | Parise | ........................... | 455/572 |
| 2004/0201361 A1 * | 10/2004 | Koh | ...................... | H02J 7/0042 |
| | | | | 320/104 |
| 2005/0046373 A1 * | 3/2005 | Aldred | ........................... | 318/580 |
| 2005/0096790 A1 * | 5/2005 | Tamura et al. | ................ | 700/245 |

(Continued)

*Primary Examiner* — Stacy Whitmore

(74) *Attorney, Agent, or Firm* — Albert J. Brunett

(57) ABSTRACT

A method is provided for operating a mobile device in an environment with a wireless energy transmitter, where the mobile device includes a drive system and a wireless energy receiver. The mobile device moves along a path using the drive system. Energy is wirelessly received from the energy transmitter using the energy receiver as the mobile device moves and/or is parked along at least a portion of the path.

20 Claims, 6 Drawing Sheets

(56) References Cited

U.S. PATENT DOCUMENTS

| | | | |
|---|---|---|---|
| 2006/0273749 A1* | 12/2006 | Im | 318/587 |
| 2008/0007193 A1* | 1/2008 | Jones et al. | 318/568.12 |
| 2008/0039974 A1* | 2/2008 | Sandin et al. | 700/258 |
| 2008/0262668 A1* | 10/2008 | Yamada | 701/22 |
| 2009/0045773 A1* | 2/2009 | Pandya et al. | 320/108 |
| 2010/0106298 A1* | 4/2010 | Hernandez et al. | 700/250 |
| 2010/0131139 A1* | 5/2010 | Sakai et al. | 701/22 |
| 2010/0224725 A1* | 9/2010 | Perlman et al. | 244/1 R |
| 2011/0030016 A1* | 2/2011 | Pino et al. | 725/80 |
| 2011/0046835 A1* | 2/2011 | Taguchi | 701/22 |
| 2011/0093139 A1* | 4/2011 | Arms | H02J 17/00 701/2 |
| 2011/0178635 A1* | 7/2011 | Anderson et al. | 700/253 |
| 2011/0184622 A1* | 7/2011 | Yamada et al. | 701/99 |
| 2011/0279244 A1* | 11/2011 | Park et al. | 340/10.34 |
| 2011/0291615 A1* | 12/2011 | Pandya et al. | 320/108 |
| 2011/0315496 A1* | 12/2011 | Bohori et al. | 191/10 |
| 2012/0001497 A1* | 1/2012 | Sada et al. | 307/104 |
| 2012/0074891 A1* | 3/2012 | Anderson et al. | 320/101 |
| 2012/0078458 A1* | 3/2012 | Yamada et al. | 701/22 |
| 2012/0091949 A1* | 4/2012 | Campanella et al. | 320/108 |
| 2012/0091950 A1* | 4/2012 | Campanella | H02J 5/005 320/108 |
| 2012/0112535 A1* | 5/2012 | Karalis et al. | 307/10.1 |
| 2012/0146578 A1* | 6/2012 | Krestel | 320/108 |
| 2012/0206098 A1* | 8/2012 | Kim | 320/108 |
| 2012/0217816 A1* | 8/2012 | Wang | H02J 5/005 307/104 |
| 2013/0057210 A1* | 3/2013 | Nergaard et al. | 320/109 |
| 2013/0088194 A1* | 4/2013 | Hunter et al. | 320/108 |
| 2013/0154553 A1* | 6/2013 | Steele | 320/108 |
| 2013/0214736 A1* | 8/2013 | Phillips et al. | 320/108 |
| 2014/0062384 A1* | 3/2014 | Niizuma | 320/104 |
| 2014/0159652 A1* | 6/2014 | Hall et al. | 320/108 |
| 2014/0365258 A1* | 12/2014 | Vestal et al. | 705/7.15 |
| 2014/0373747 A1* | 12/2014 | Yagci et al. | 104/290 |
| 2015/0002092 A1* | 1/2015 | Niizuma | 320/108 |

* cited by examiner

WIRELESSLY TRANSFERRING ENERGY TO A MOBILE DEVICE

BACKGROUND OF THE INVENTION

1. Technical Field

The present invention relates generally to a mobile device and, more particularly, to powering to a mobile device.

2. Background Information

A mobile device such as a mobile robot or a remote controlled vehicle may be used to perform various tasks in personal, commercial and government applications. Such a mobile device is typically controlled by an operator using a corded or wireless remote control. The mobile device may include a drive system that moves the device around an operating environment according to commands provided by the operator through the remote control. The drive system and other components of the mobile device are typically powered by an onboard battery, which may have a relatively short operating life. The onboard battery therefore may need to be frequently replaced or recharged, which may cause undesirable interruptions in the performance of the tasks.

There is a need in the art for an improved method and system for powering a mobile device.

SUMMARY OF THE DISCLOSURE

Systems and methods are provided for powering a mobile device with an energy transfer system, which includes a wireless energy transmitter and a wireless energy receiver. The mobile device (e.g., a mobile robot or vehicle) may include a drive system, a manipulator system and/or the energy receiver. In one method, the mobile device moves along a path using the drive system. Energy is wirelessly received from the energy transmitter using the energy receiver as the mobile device moves along at least a portion of the path. In another method, a task is at least partially performed with the drive system and/or the manipulator system, and the energy is wirelessly transferred to the energy receiver using the energy transmitter.

BRIEF DESCRIPTION OF THE DRAWINGS

The following detailed description will be better understood when read in conjunction with the appended drawings, in which there is shown one or more embodiments of the present disclosure. It should be understood, however, that the various embodiments of the present disclosure are not limited to the precise arrangements and instrumentalities shown in the drawings.

DETAILED DESCRIPTION

Figure 1:
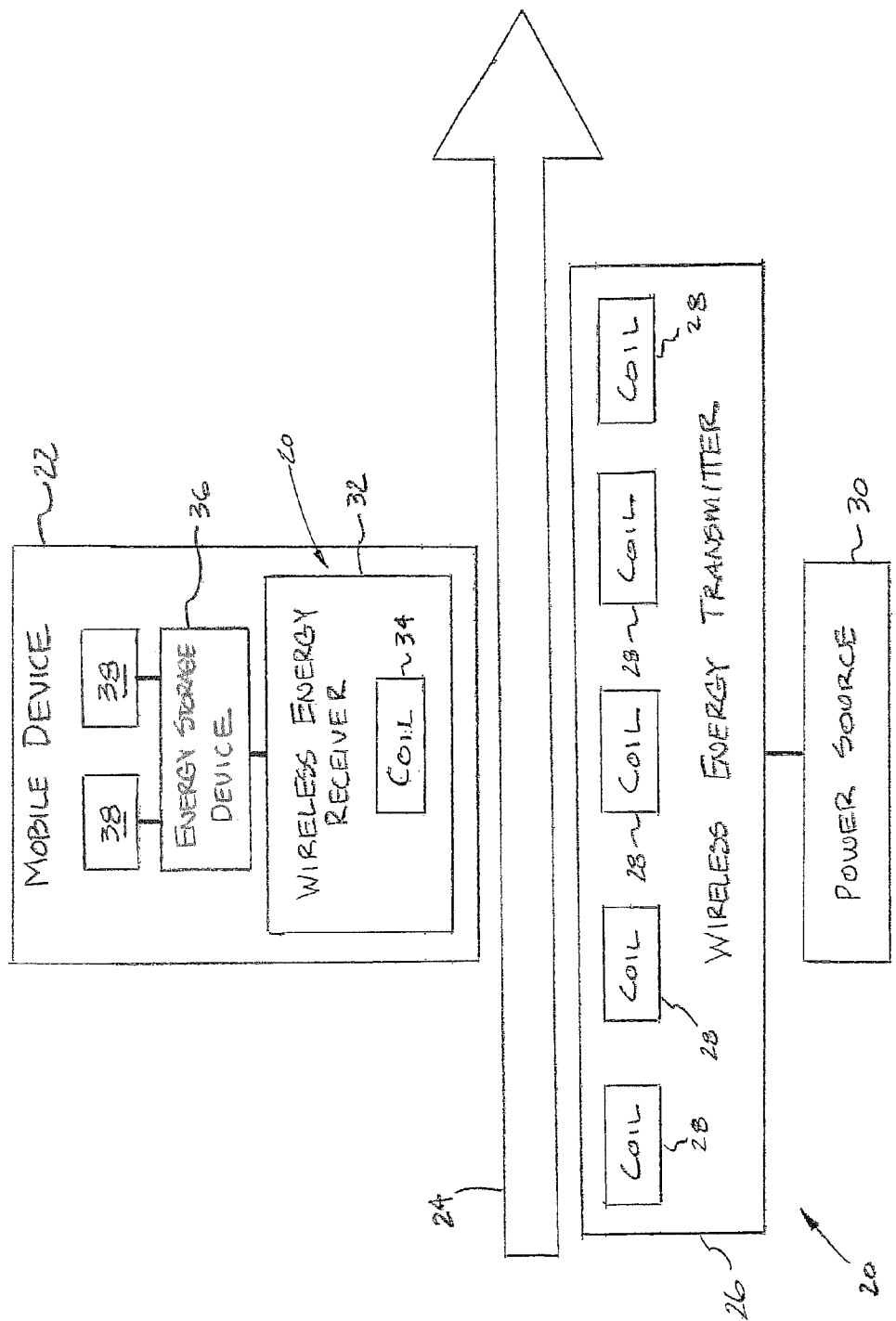
FIG. 1 is a block diagram of an energy transfer system for a mobile device that moves along a mobile device path.

FIG. 1 illustrates an energy transfer system 20 for a mobile device 22 that moves along a mobile device path 24. The mobile device 22 may be configured as a mobile robot as described below in further detail. Alternatively, the mobile device 22 may be configured as an automobile, a motorcycle, a truck, a bus, a train, a forklift, a tractor, or any other type of personal, commercial or industrial vehicle. The path 24 may be configured as at least a portion of a hallway, a pathway or a roadway. Alternatively, the path 24 may be configured as at least a portion of a floor or the ground that extends between and/or around one or more rows and/or stacks of pallets, storage containers, shelves and/or bins. Still alternatively, the path 24 may be configured as a floor of an elevator car or any other type of cargo and/or passenger lift and/or transportation device. The present invention, however, is not limited to the foregoing mobile device or path configurations.

The energy transfer system 20 includes a wireless energy transmitter 26 that may be stationary relative to the path 24, and extends along at least a portion of the path 24. The energy transmitter 26, for example, may be fixedly arranged adjacent, on or above the path 24. The energy transmitter 26 may include one or more transmitter coils 28, which are electrically coupled with a power source 30. The power source 30 may include an electrical outlet that receives electricity from an electric grid. Alternatively, the power source 30 may include a direct current (DC) to alternating current (AC) inverter that is electrically coupled with one or more batteries and/or generators. The present invention, however, is not limited to the foregoing energy transmitter or power source components or configurations.

The energy transfer system 20 also includes a wireless energy receiver 32 that is arranged with the mobile device 22, and may move relative to the energy transmitter 26. The energy receiver 32 may include at least one receiver coil 34. The receiver coil 34 is electrically coupled with an energy storage device 36, which powers one or more components 38 (e.g., a drive system, a manipulator system, etc.) of the mobile device 22. The energy storage device 36 may include one or more batteries, one or more capacitors and/or any other type of device that may store electric energy. The receiver coil 34 may also or alternatively be electrically coupled with one or more of the components 38. The present invention, however, is not limited to the foregoing energy receiver or energy storage device components or configurations.

The energy transmitter 26 may wirelessly transfer energy to the energy receiver 32 as the mobile device 22 moves along the path 24. The conductively independent transmitter and receiver coils 28 and 34, for example, may form at least one transformer where the receiver coil 34 is located adjacent (e.g., moving next to) one or more of the transmitter coils 28. One or more of the transmitter coils 28 use electric current received from the power source 30 to generate a changing electromagnetic field. This electromagnetic field may induce an electric current in the receiver coil 34. The receiver coil 34 may provide the induced electric current to the energy storage device 36 to charge the energy storage device 36. The receiver coil 34 may also or alternatively provide the induced electric current to one or more of the components 38 to directly power those components.

The mobile device 22 may move along various mobile device paths other than the path 24 and/or anywhere in an open space. For example, referring to FIG. 2, the path 24 may be connected to one or more additional paths 40. The mobile device 22 may move along one or more of these additional paths 40, but return to the path 24 to charge the energy storage device 36 (see FIG. 1). The mobile device 22 may also or alternatively move along the path 24 while travelling between two or more of the paths 40.

Figure 2:
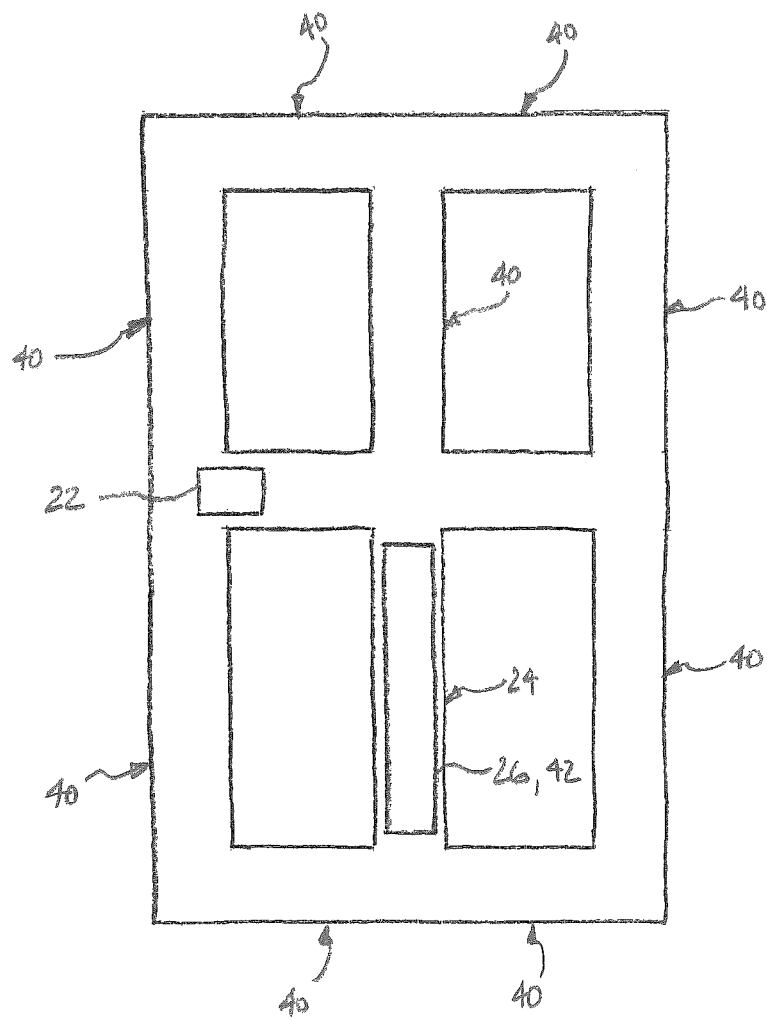
FIG. 2 is an illustration of an energy transfer system and a mobile device in an operating environment.

Referring to FIGS. 1 and 2, the mobile device 22 may be operated in various modes during system operation. For example, where a charge level of the energy storage device 36 is greater than a (e.g., predetermined) threshold, the mobile device 22 may operate in a first mode. In contrast, where the charge level of the energy storage device 36 is less than or substantially equal to the threshold, the mobile device 22 may be operated in a second mode, a third mode, and/or a fourth mode. The present invention, however, is not limited to any particular modes of operation.

In the first mode, the mobile device 22 may move along any of the paths 24 and 40 as needed to perform one or more tasks. The mobile device 22, for example, may transport material, cargo and/or people between various locations along the paths 24 and/or 40.

In the second mode, the mobile device 22 may move along the path 24 to charge the energy storage device 36 by taking an indirect or alternative route while performing one or more tasks. The mobile device 22, for example, may deviate from a first (e.g., direct) route that may not include the path 24 to a second (e.g., indirect) route that includes the path 24 order to charge the energy storage device 36. A travel time and/or a distance along the first route between a first location and a second location may be different (e.g., less or greater) than or substantially equal to a travel time and/or a distance along the second route between the first and the second locations.

In the third mode, the mobile device 22 may move (or park) along the path 24 to charge the energy storage device 36 before performing one or more tasks where, for example, the mobile device 22 will be unable to divert to the path 24 while performing those tasks. For example, where the mobile device 22 is a mobile robot moving packages in a warehouse, the mobile robot may move (or park) along the path 24 to charge its energy storage device 36 before a large shipment of packages is delivered or is to be shipped.

In the fourth mode, the mobile device 22 may park and/or move within an elevator car to charge the energy storage device 36 where the path 24 is defined by and the energy transmitter 26 is arranged with the elevator car.

The mobile device 22 may move along the path 24 during a charge mode (e.g., the second, the third and/or the fourth modes) at substantially the same speed as during a non-charge mode (e.g., the first mode). Alternatively, the mobile device 22 may reduce its speed while charging, as compared to not charging, the energy storage device 36 in order to increase a charge time. The mobile device 22, for example, may reduce its speed (or stop) while moving along the path 24 during the second mode such that there is additional time for the energy receiver 32 to receive energy from the energy transmitter 26. Such a reduction in speed may be performed, for example, while the mobile device 22 is performing a task, or between the performances of tasks.

The energy transfer system 20 and the mobile device(s) 22 may be operated in various indoor and/or outdoor environments. For example, the energy transfer system 20 and the mobile device 22 may be operated within a building such as, for example, a warehouse, an office, a hospital, an airport, a shipping depot, a train station, a residential house, or a temporary structure (e.g., a tent). Alternatively, the energy transfer system 20 and the mobile device 22 may be operated on a roadway or a parcel of land such as, for example, a storage yard, a shipping yard, a parking lot or a camp. Still alternatively, the energy transfer system 20 and the mobile device 22 may be operated onboard another vehicle such as, for example, a train, an aircraft, a shipping vessel, or a submersible. The present invention, however, is not limited to the foregoing types of operating environments.

Figure 3:
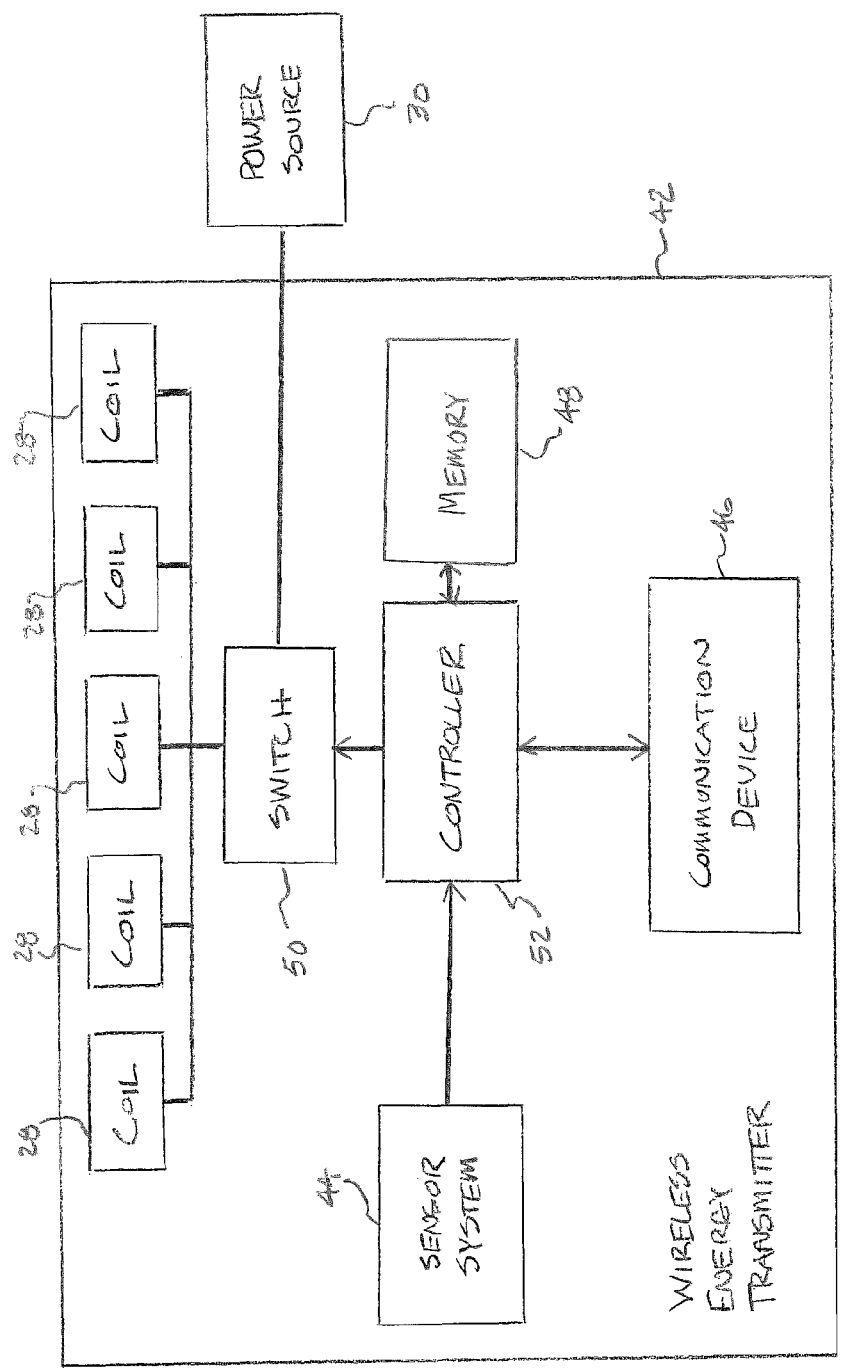
FIG. 3 is a block diagram of a wireless energy transmitter configured with a power source.

FIG. 3 illustrates an alternate embodiment wireless energy transmitter 42 that is configured to selectively transmit energy to the energy receiver 32 (see FIG. 1). In contrast to the energy transmitter 26 of FIG. 1, the energy transmitter 42 also includes a sensor system 44, a communication device 46, memory 48, a switch 50 and a controller 52.

The sensor system 44 includes one or more proximity sensors. Referring to FIGS. 2 and 3, the proximity sensors are configured to determine a spatial distance between the mobile device 22 and the energy transmitter 42, and provide one or more sensor signals indicative thereof. Examples of a proximity sensor may include, but are not limited to, a radar system, an infrared system, a laser system, a camera system, and a radio transceiver.

The communication device 46 includes a cellular, satellite and/or radio receiver. The communication device 46 may also include a cellular, satellite and/or radio transmitter.

The memory 48 (e.g., a non-transitory computer readable medium) may be configured to store software (e.g., program instructions) for execution by the controller 52. The memory 48 may include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The switch 50 is configured to electrically couple the power source 30 to one or more components of the energy transmitter 42 (e.g., the coils 28) in response to receiving a first command signal. The switch 50 is also configured to electrically decouple the power source 30 from one or more components of the energy transmitter 42 (e.g., the coils 28) in response to receiving a second command signal. The switch 50 may include one or more transistors (e.g., MOSFETs), one or more solid state relays (e.g., rectifiers), one or more logic gates, and/or one or more optical couplers. The present invention, however, is not limited to the foregoing switch components.

The controller 52 is in signal communication (e.g., hard-wired or wirelessly connected) with the sensor system 44, the communication device 46, the memory 48 and the switch 50. The controller 52 may be implemented using hardware or a combination of hardware and software. The controller 52 may include one or more processing devices, analog and/or digital circuitry, etc.

The controller 52 may signal the switch 50 to energize one or more components of the energy transmitter 42 (e.g., the coils 28) based on one or more signals received from the sensor system 44 and/or the communication device 46. The controller 52, for example, may provide the first command signal to the switch 50 where the controller 52 receives a sensor signal from the sensor system 44 that indicates the mobile device 22 is located within a certain distance of the energy transmitter 42 and/or is moving towards the energy transmitter 42. The controller 52 may also or alternatively provide the first command signal to the switch 50 where the controller 52 receives a communication signal from the mobile device 22 or another device through the communication device 46. The mobile device 22 may provide the communication signal, for example, where a charge level of the energy storage device 36 is below or substantially equal to a threshold. Alternatively, the communication signal may indicate the mobile device 22 is being operated in the second mode as described above.

The controller 52 may signal the switch 50 to de-energize one or more components of the energy transmitter 42 (e.g., the coils 28) based on one or more signals received from the sensor system 44 and/or the communication device 46. The controller 52, for example, may provide the second command signal to the switch 50 where the controller 52 receives a sensor signal from the sensor system 44 that indicates the mobile device 22 is located outside of a certain distance of the energy transmitter 42 and/or is moving away from the energy transmitter 42. The controller 52 may also or alternatively provide the second command signal to the switch 50 where the controller 52 receives a communication signal from the mobile device 22 or another device through the communication device 46. The mobile device 22 may provide the communication signal, for example, where a charge level of the energy storage device 36 is above a threshold. Alternatively, the communication signal may indicate the mobile device 22 is being operated in the first mode as described above. In this manner, the controller 52 may reduce the energy consumed by the energy transmitter 42 during system operation.

Figure 4:
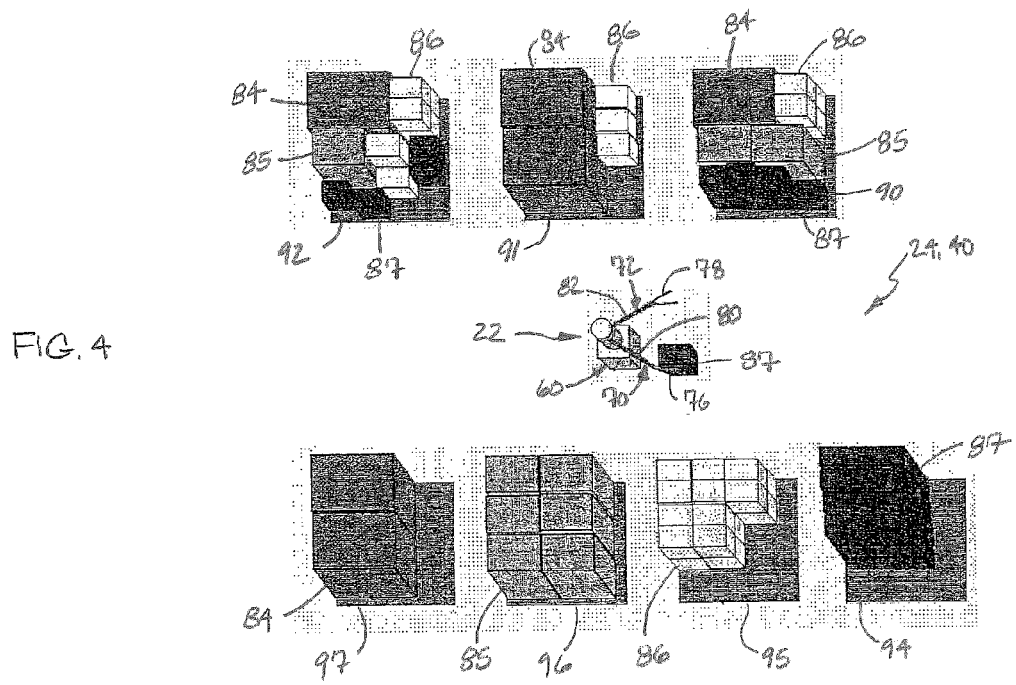
FIG. 4 is an illustration of a mobile device loading an article onto a support surface.

In some embodiments, referring to FIG. 4, the mobile device 22 may be configured as an autonomous mobile robot that may perform one or more tasks without continuous outside control and/or intervention. The mobile device 22, for example, may receive instructions to perform a certain task at a certain location along one or more of the paths 24 and 40. The mobile device 22 may subsequently determine and perform the operation(s) necessary to move to the location and/or complete the task based on, for example, its current location, surrounding obstacles, its operating environment, the type of task to be performed, etc. The mobile device 22 may also adapt to unknown, new and/or changing operating environments without additional outside control and/or intervention.

The mobile device 22 may be fully autonomous or semi-autonomous. The term "fully autonomous" is used to describe a device that may perform one or more tasks without, for example, any outside control and/or intervention. A fully autonomous mobile robot, for example, may perform a task without receiving instructions (e.g., vectors, commands, etc.) from a human operator during performance of the task. The term "semi-autonomous" is used to describe a device that may perform one or more tasks without, for example, continuous outside control. A semi-autonomous mobile robot, for example, may perform a task utilizing one or more periodic instructions from a human operator that bound and/or qualify the performance of the task. The instructions, for example, may provide an updated location of where the task is to be performed, identify an unknown obstacle, control the scope of the task, control when the task should be performed, etc.

Figure 5:
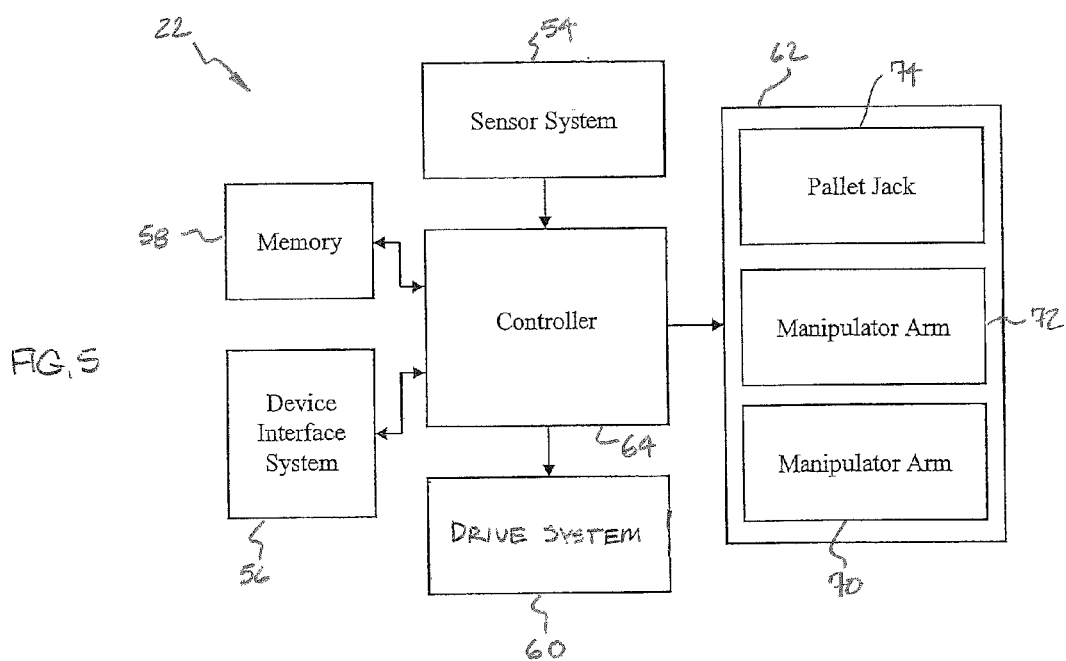
FIG. 5 is a block diagram of a mobile device.

Referring to FIG. 5, the mobile device 22 includes a sensor system 54, a device interface system 56, memory 58, a drive system 60 (e.g., a mobile platform), a manipulator system 62, the energy receiver 32 and the energy storage device 36, where the components 32 and 36 are not shown in FIG. 5 for ease of illustration. The mobile device 22 also includes a controller 64 that is in signal communication with the sensor system 54, the device interface system 56, the memory 58, the drive system 60 and the manipulator system 62. The controller 64 may be implemented using hardware or a combination of hardware and software. The controller 64 may include one or more processing devices, analog and/or digital circuitry, etc. In alternate embodiments, the controller 64 and the controller 52 may be configured as a single unit.

The sensor system 54 is configured to survey the mobile device's surroundings and operating environment, and/or to receive location data. The sensor system 54 includes one or more location and/or proximity sensors that spatially locate (e.g., triangulate) the mobile device 22 relative to, for example, its surrounding environment, its geographic location, and/or one or more locators (e.g., RF tags, physical landmarks, etc.). Examples of a location and/or proximity sensor include, but are not limited to, a global positioning system (GPS) receiver, a radar system, an infrared system, a laser system, and a radio transceiver. The sensor system 54 may also include one or more sensors that measure the charge level of the energy storage device 36 (see FIG. 1).

The device interface system 56 is configured to receive instructions in the form of control data from an operator and/or from a remote control system. The device interface system 56 may also be configured to communicate data to the operator, the remote control system and/or the energy transmitter 26, 42 (see FIGS. 1 and 3). The device interface system 56 includes a communication device and/or an operator interface. The communication device may include a cellular, satellite and/or radio transmitter, and/or a cellular, satellite and/or radio receiver. The operator interface may include one or more input and/or output (I/O) devices such as, for example, a display screen, a speaker, a touch screen, a keypad, a voice command system with an electro-acoustic transducer (e.g., microphone), etc.

The memory 58 (e.g., a non-transitory computer readable medium) may be configured to store software for execution by the controller 64. The memory 58 may include a volatile memory and/or a nonvolatile memory.

Figure 7:
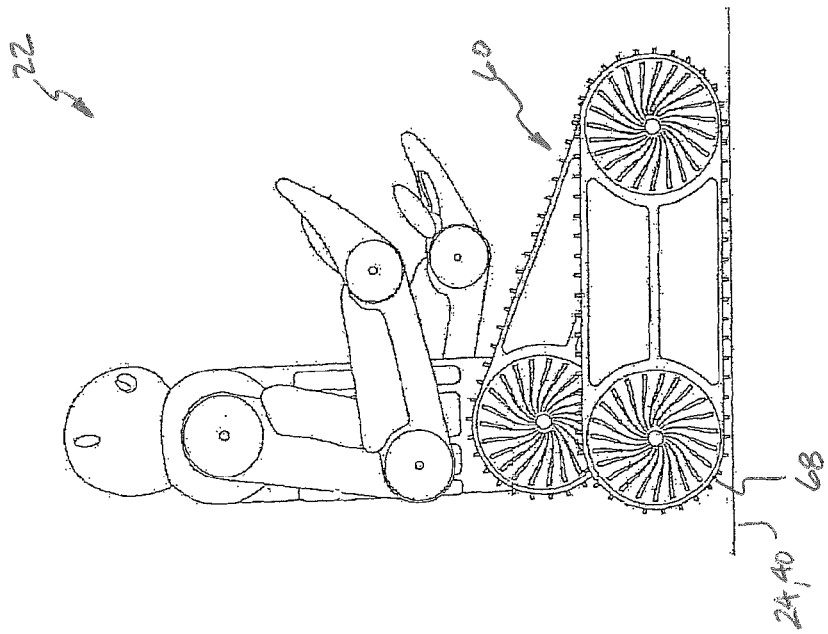
FIG. 7 is an illustration of another autonomous mobile robot.
Figure 6:
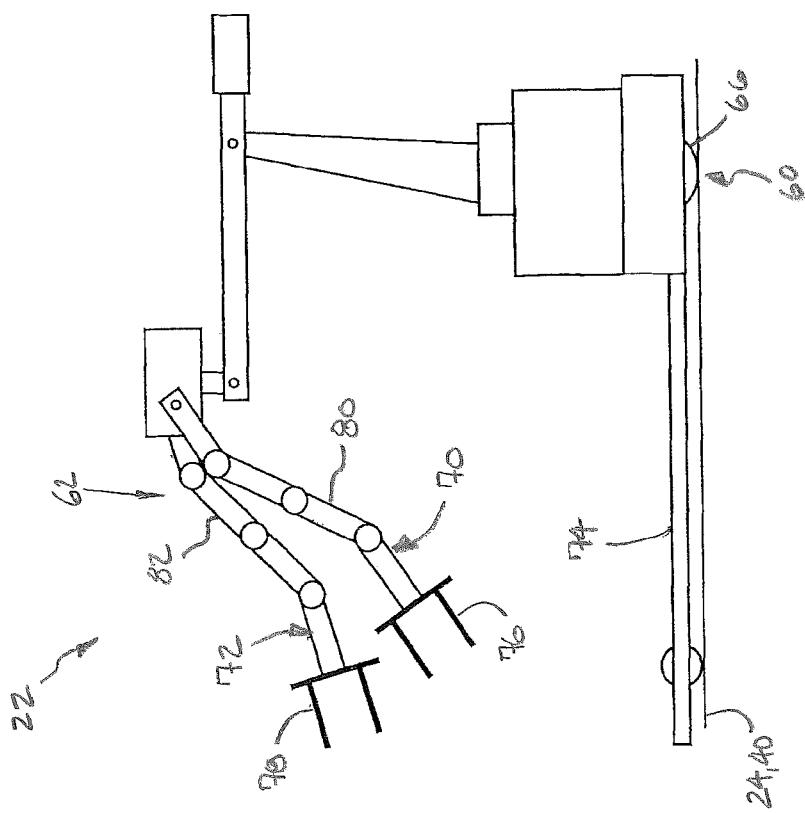
FIG. 6 is an illustration of an autonomous mobile robot.

The drive system 60 is configured to move the mobile device 22 along one or more of the paths 24 and 40 (see FIG. 2) and to various locations within the operating environment. The drive system 60 may include one or more motorized and/or steerable propulsion devices such as, for example, motorized drive wheels, motorized track systems, etc. An embodiment of the drive system 60 with motorized drive wheels 66 is illustrated in FIG. 6. An embodiment of the drive system 60 with motorized (e.g., robotic and multi-linkage) track systems 68 is illustrated in FIG. 7. The present invention, however, is not limited to the foregoing mobile platform configurations and components.

Referring again to FIG. 5, the manipulator system 62 includes one or more electronically, hydraulically, pneumatically and/or mechanically actuated manipulators configured to move one or more articles within the operating environment. Examples of a manipulator include, but are not limited to, a robotic manipulator arm (e.g., a multi-axis manipulator arm), a pallet jack, a lift platform, a conveyor system, a slide carriage, a crane, etc. In the specific embodiment illustrated in FIG. 6, the manipulator system 62 includes a plurality of robotic manipulator arms 70 and 72 and a pallet jack 74. Each of the robotic manipulator arms 70 and 72 respectively includes an end effector 76, 78 connected to one or more arm members 80, 82 (e.g., linkages). Examples of an end effector include, but are not limited to, a gripping device, a suction device, an electromagnet, a winch, a clasp, etc. Alternative examples of a manipulator system are disclosed in U.S. Pat. Nos. 7,902,784; 7,719,222 and 7,348,747, each of which is hereby incorporated herein by reference in its entirety. The present invention, however, is not limited to the foregoing manipulator system configurations and components.

Referring to FIG. 4, the mobile device 22 may autonomously load one or more articles 84-87 onto one or more support surfaces 90-92, where these articles 84-87 may have different (or similar) shapes, sizes, weights, etc. Examples of articles include boxes, crates, containers, packages, barrels, canisters, luggage, chests, and amorphous bags, sacks and other such objects. Other examples of articles include electronic and/or mechanical devices and equipment, etc. Examples of support surfaces include pallets, cargo bay floors, warehouse floors, truck beds, ship hold floors, etc. Other examples of support surfaces include interior surfaces of support containers, boxes and the like in which the articles may be placed and subsequently transported and/or stored. The present invention, however, is not limited to any particular article and/or support surface types or configurations.

The mobile device 22 may load one or more of the articles 84-87 onto a first of the support surfaces (e.g., the transport pallet 90), for example, by gathering the articles from one or more respective source pallets 94-97 and arranging the gathered articles onto the first support surface 90. Each of the source pallets 94-97 is located at a respective article pickup location, and may support (e.g., hold) similar types of articles; e.g., the source pallet 94 supports the articles 87, the source pallet 95 supports the articles 86, etc. Each of the support surfaces 90-92 is located at a respective support surface location and may support one or more different types of articles. The articles loaded onto the first support surface 90 may be selected based on, for example, a destination of the first support surface, intended (e.g., medical, culinary, warfare/combat, humanitarian aid, etc.) use of the articles, etc. Subsequent to the loading, the mobile device 22 or another device (e.g., a fork lift, crane, conveyor, etc.) may move the loaded first support surface 90 onto a vehicle (e.g., a ship, train, truck, helicopter, airplane, submersible, spacecraft, etc.) for transport to another location (e.g., final destination), or into a building (e.g., warehouse, business, etc.) or other facility for storage or subsequent distribution.

Figure 8:
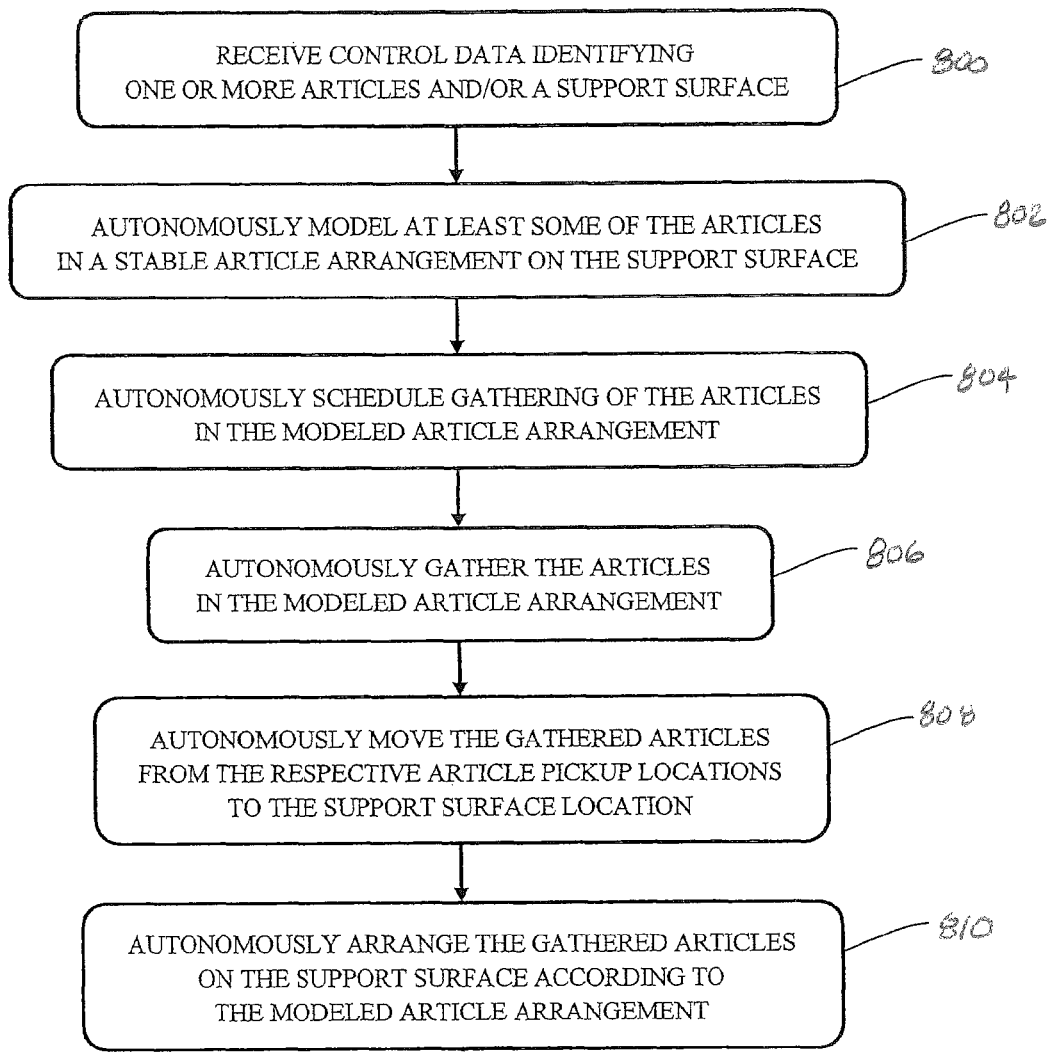
FIG. 8 is a flow diagram of a method for loading articles on a support surface using a mobile device.

FIG. 8 is a flow diagram of a method for loading a plurality of the articles (e.g., articles 84-87) on a first support surface 90 using the mobile device 22 illustrated in FIGS. 5 and 6. In step 800, the controller 64 receives control data (e.g., one or more vectors, commands, etc.) through the device interface system 56. The control data may include inventory data, location data, etc. The inventory data may, for example, identify the contents, types, states (e.g., amorphous or non-amorphous), masses and/or weights, dimensions, et cetera, of the articles to be arranged on the first support surface 90. The location data may, for example, identify the respective article pickup locations, and/or the respective support surface locations. Alternatively, the controller 64 may autonomously determine the article pickup locations and/or the support surface locations using the sensor system 54 where, for example, the articles 84-87 and/or the support surfaces 90-92 are configured with RF ID tags, locator beacons, etc. The controller 64 may alternatively and/or additionally identify the articles 84-87 using image and shape recognition software. The control data may also include other types of data such as, for example, scheduling data that designates on which support surface(s) and by when and/or in which order the articles should be loaded.

In step 802, the controller 64 autonomously models at least some of the articles (e.g., the articles 84-87) in a stable article arrangement on the first support surface 90. The term "stable" is used to describe an article arrangement having, for example, (i) a relatively low center of gravity, (ii) articles that are substantially supported by the support surface and/or other articles in the arrangement, (iii) articles that are (e.g., equally) balanced on the support surface and/or other articles in the arrangement, etc. Methods for modeling a stable article arrangement are disclosed in U.S. patent application Ser. Nos. 13/678,193 and 13/678,242, each of which is hereby incorporated herein by reference in its entirety.

In step 804, the controller 64 autonomously schedules the order in which the articles in the modeled article arrangement are to be gathered and moved to the first support surface location. The controller 64, for example, may schedule base articles to be gathered and moved before stacked articles such that the stacked articles may be properly disposed on the base articles. In another example, the controller 64 may schedule the article proximate a back side of the first support surface to be gathered and moved before the articles proximate to a front side of the first support surface.

In step 806, the mobile device 22 autonomously gathers one or more of the articles (e.g., the article 84-87) in the modeled article arrangement. The controller 64, for example, may signal the drive system 60 to move the mobile device 22 along one or more of the paths 24 and 40 to the article pickup location. The controller 64 may subsequently signal the manipulator system 62 to pick up the article 87 with one or more of the robotic manipulator arms (e.g., the manipulator arm 70). The end effector 76, for example, may engage (e.g., grip) the article 87 utilizing one of a plurality of article engagement (e.g., gripping) techniques, and the arm member 80 may lift the article 87 off of the respective source pallet 94. In another example, the controller 64 may signal the manipulator system 62 to pick up one of the articles with the first robotic manipulator arm 70, and to pick up another one of the articles with the second robotic manipulator arm 72.

In step 808, the mobile device 22 autonomously moves the gathered article(s) along one or more of the paths from the respective article pickup location(s) to the first support surface location. The controller 64, for example, may signal the drive system 60 to move the mobile device 22 from the first article pickup location to the first support surface location.

In step 810, the mobile device 22 autonomously arranges the gathered article(s) on the first support surface 90 according to the modeled article arrangement. The controller 64, for example, may signal the manipulator system 62 to place the article 87 in a particular position and orientation on the first support surface 90 using, for example, the robotic manipulator arm 70 holding the article 87.

A system may include a plurality of the mobile devices 22. One or more of these mobile devices 22 may move (or park) along the path 24 to wirelessly receive energy from the energy transmitter 26. Each of the mobile devices 22 may also be operated to collectively or independently perform one or more tasks.

The mobile devices 22 may communicate with one another and/or receive commands from the remote control system in order to schedule when each of the mobile devices 22 moves along the path 24 to reduce or prevent mobile device 22 congestion. The mobile devices 22 may also or alternatively communicate with one another and/or receive commands from the remote control system in order to schedule which of the mobile devices 22 will perform a certain task based on, for example, one or more of the following parameters:

predicted amount of energy to perform the task (e.g., load an article, transport the article to a destination, and/or unload the article at the destination);

predicted amount of energy to move each mobile device to a start location at which the respective mobile device will start performance of the task if selected;

current and/or acquired charge level of each mobile device as it moves;

predicted charge level of each mobile device at a time at which the respective mobile device will start performance of the task if selected;

distance between each mobile device and the task location;

time for each mobile device to travel to the task location; and/or time at which the task is scheduled to be performed.

By using and/or weighting one or more of the foregoing parameters, one or more of the mobile devices 22 may be autonomously selected to perform one or more tasks. Other information, of course, may also or alternatively be used to schedule and/or allocate tasks to one or more of the mobile devices 22.

One of the mobile devices 22 may be selected to perform a task where that mobile device has the greatest charge level.

One of the mobile devices 22 may be selected to perform a task where that mobile device is identified as having a high enough charge level to perform the task without (or with minimal) charging during the task; e.g., the charge level is above a predicted energy level threshold for that task. Where a plurality of the mobile devices 22 has a sufficient charge level to perform the task, the mobile device may be selected based on, for example, which one of these devices is closest in distance and/or time to the start location.

Where none of the available mobile devices 22 has a sufficient charge to perform a task, one of the mobile devices 22 may be selected to perform the task where, for example, a route from its current location to the start location includes the path 24. Alternatively, the mobile device 22 may be selected where the route from its current location to the start location is closest in time and/or distance to the path 24.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

Although the description above contains many specific examples, these should not be construed as limiting the scope of the embodiments of the present disclosure, but as merely providing illustrations of some of the presently preferred embodiments of the present invention. It will be appreciated by those skilled in the art that changes could be made to the embodiments described above without departing from the broad inventive concept thereof. It is to be understood therefore that this disclosure is not limited to the specific embodiments disclosed herein, but it is intended to cover modifications within the spirit and scope of the embodiments of the present disclosure. Accordingly, the present invention is not to be restricted except in light of the attached claims and their equivalents.

What is claimed is:

1. A method for operating in an environment, the method comprising:
    operating an autonomous mobile device to autonomously move along at least a first path within the environment during a first mode using a drive system, wherein the autonomous mobile device comprises the drive system, a wireless energy receiver and an energy storage device, and wherein the autonomous mobile device autonomously selects to operate in the first mode where a charge level of the energy storage device is above a threshold;
    operating the autonomous mobile device to autonomously move along at least a second path within the environment during a second mode using the drive system in order to charge the energy storage device while the autonomous mobile device moves along the second path, wherein the autonomous mobile device autonomously selects to operate in the second mode where the charge level of the energy storage device is below the threshold;
    wirelessly receiving energy from a wireless energy transmitter within the environment using the wireless energy receiver as the autonomous mobile device moves along at least a portion of the second path; and
    charging the energy storage device with the transferred energy.

2. The method of claim 1, wherein
    the autonomous mobile device moves at a constant first speed along the at least a portion of the second path when operating in the second mode; and
    the autonomous mobile device moves at a constant second speed along at least a portion of the first path when operating in the first mode, and the second speed is faster than the first speed.

3. The method of claim 1, wherein
    the autonomous mobile device moves at a constant first speed along the at least a portion of the second path when operating in the second mode; and
    the autonomous mobile device moves at a constant second speed along at least a portion of the first path when operating in the first mode, and the second speed is equal to the first speed.

4. The method of claim 1, further comprising:
    operating the autonomous mobile device to perform a task;
    wherein the autonomous mobile device operates in the first mode while performing the task; and
    wherein the autonomous mobile robot operates in the second mode before performing the task to ensure the charge level of the energy storage device is a high enough such that the autonomous mobile device is operable to perform at least the task.

5. The method of claim 1, further comprising:
    autonomously performing a task with the autonomous mobile device; and
    delaying performance of the task to move the autonomous mobile device along the second path.

6. The method of claim 1, further comprising autonomously performing a task with the autonomous mobile device at a first location, wherein the autonomous mobile device moves along the second path between the first location and a second location.

7. The method of claim 1, wherein the autonomous mobile device comprises a vehicle.

8. The method of claim 1, wherein the autonomous mobile device comprises a mobile robot with one or more manipulators.

9. The method of claim 1, further comprising:
    routing the autonomous mobile device from a first route to a second route that includes the second path such that the wireless energy receiver wirelessly receives the energy from the wireless energy transmitter;
    wherein a distance along the first route between a first location and a second location is less than a distance along the second route between the first location and the second location, and/or a travel time along the first route between the first location and the second location is less than a travel time along the second route between the first location and the second location.

10. The method of claim 9, wherein the autonomous mobile device uses more energy to move along the second route than to move along the first route.

11. The method of claim 1, further comprising:
    routing the autonomous mobile device from a first route to a second route that includes the second path such that the wireless energy receiver wirelessly receives the energy from the wireless energy transmitter;

wherein a distance along the first route between a first location and a second location is greater than a distance along the second route between the first location and the second location, and/or a travel time along the first route between the first location and the second location is greater than a travel time along the second route between the first location and the second location.

12. The method of claim 1, wherein the second path is defined within an elevator.

13. The method of claim 1, further comprising:
energizing a component of the wireless energy transmitter using a switch where the switch receives a command signal, wherein the wireless energy transmitter includes the switch;
wherein the wirelessly transferring comprises wirelessly transferring the energy from the wireless energy transmitter to the wireless energy receiver using the energized component.

14. The method of claim 13, further comprising generating the command signal based on a second signal that is received from a proximity sensor, wherein the energy transmitter includes the proximity sensor.

15. The method of claim 13, further comprising:
receiving a second signal from the mobile device at the energy transmitter; and
generating the command signal based on the received second signal.

16. The method of claim 13, further comprising generating the command signal where a charge level of the energy storage device is below a threshold.

17. The method of claim 13, further comprising de-energizing the component of the wireless energy transmitter using the switch where the switch receives a second command signal.

18. The method of claim 1, wherein the autonomous mobile device is one of a plurality of autonomous mobile devices within the environment, and the method further comprise:
determining a plurality of operating parameters for a first of the autonomous mobile devices and a second of the autonomous mobile devices, the operating parameters comprising:
predicted amount of energy for each of the first and the second autonomous mobile devices to perform a task;
predicted amount of energy for each of the first and the second autonomous mobile devices to move to a location at which performance of the task will start; and
predicted charged level for each of the first and the second autonomous mobile devices and/or current charged level for each of the first and the second autonomous mobile devices;
processing the operating parameters for the first of the autonomous mobile devices and the second of the autonomous mobile devices to select which one of the first of the autonomous mobile devices and the second of the autonomous mobile devices should perform the task; and
instructing the selected one of the autonomous mobile devices to perform the task.

19. A method for operating in an environment, the method comprising:
operating an autonomous mobile robot to autonomously move along at least a first path within the environment during a first mode using a drive system, wherein the autonomous mobile robot comprises the drive system, a wireless energy receiver and an energy storage device, and wherein the autonomous mobile robot autonomously selects to operate in the first mode where a charge level of the energy storage device is above a threshold;
operating the autonomous mobile robot to autonomously move along at least a second path within the environment during a second mode using the drive system in order to charge the energy storage device while the autonomous mobile robot moves along the second path, wherein the autonomous mobile robot autonomously selects to operate in the second mode where the charge level of the energy storage device is below the threshold;
wirelessly receiving energy from a wireless energy transmitter within the environment using the wireless energy receiver as the autonomous mobile robot moves along at least a portion of the second path; and
charging the energy storage device with the transferred energy;
wherein the autonomous mobile robot moves at a first speed along the at least a portion of the second path when operating in the second mode; and
wherein the autonomous mobile robot moves at a second speed along at least a portion of the first path when operating in the first mode, and the second speed is faster than the first speed.

20. A method for operating in an environment, the method comprising:
providing a plurality of autonomous mobile devices within the environment, each of the autonomous mobile devices comprising a drive system, a wireless energy receiver and an energy storage device;
determining a plurality of operating parameters for a first of the autonomous mobile devices and a second of the autonomous mobile devices, the operating parameters comprising:
predicted amount of energy for each of the first and the second autonomous mobile devices to perform a task;
predicted amount of energy for each of the first and the second autonomous mobile devices to move to a location at which performance of the task will start; and
predicted charged level for each of the first and the second autonomous mobile devices and/or current charged level for each of the first and the second autonomous mobile devices;
processing the operating parameters for the first of the autonomous mobile devices and the second of the autonomous mobile devices to select which one of the first of the autonomous mobile devices and the second of the autonomous mobile devices should perform the task;
instructing the selected one of the autonomous mobile devices to perform the task;
operating one of the autonomous mobile robots to autonomously move along at least a first path within the environment during a first mode using its drive system, wherein the one of the autonomous mobile robots selects to operate in the first mode where a charge level of its energy storage device is above a threshold;
operating the one of the autonomous mobile robots to autonomously move along at least a second path within the environment during a second mode using its drive system in order to charge its energy storage device while the one of the autonomous mobile robots moves along the second path, wherein the one of the autonomous mobile robots selects to operate in the second mode where the charge level of its energy storage device is below the threshold;

wirelessly receiving energy from a wireless energy transmitter within the environment using the wireless energy receiver of the one of the autonomous mobile robots as the one of the autonomous mobile robots moves along at least a portion of the second path; and charging the energy storage device of the one of the autonomous mobile robots with the transferred energy.

\* \* \* \* \*